(12) United States Patent
Bellanger et al.

(10) Patent No.: US 7,942,473 B2
(45) Date of Patent: May 17, 2011

(54) UNDERFRAME FOR MOTOR VEHICLE

(75) Inventors: Alain Bellanger, Issou (FR); Thibaud Hacquard, Le Mee sur Seine (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 12/594,651

(22) PCT Filed: Mar. 14, 2008

(86) PCT No.: PCT/FR2008/050447
§ 371 (c)(1),
(2), (4) Date: Dec. 23, 2009

(87) PCT Pub. No.: WO2008/132366
PCT Pub. Date: Nov. 6, 2008

(65) Prior Publication Data
US 2010/0244496 A1    Sep. 30, 2010

(30) Foreign Application Priority Data
Apr. 4, 2007 (FR) .................................. 07 02463

(51) Int. Cl.
*B60J 7/00* (2006.01)
(52) U.S. Cl. .................. 296/204; 296/209; 296/187.08; 296/193.07

(58) Field of Classification Search .................. 296/204, 296/209, 187.08, 193.07, 187.03, 203.03; 280/781, 784
See application file for complete search history.

(56) References Cited

U.S. PATENT DOCUMENTS

| 4,129,330 A | 12/1978 | Schwuchow |
| 4,557,519 A * | 12/1985 | Matsuura ...................... 296/204 |
| 4,824,166 A * | 4/1989 | Denker et al. ................ 296/204 |
| 6,209,948 B1 | 4/2001 | Mori et al. |
| 7,204,547 B2 * | 4/2007 | Okana et al. .................. 296/204 |
| 2005/0046236 A1 | 3/2005 | Nakamura et al. |
| 2005/0082877 A1 | 4/2005 | Gotou et al. |
| 2005/0264042 A1 | 12/2005 | Abe et al. |

FOREIGN PATENT DOCUMENTS

| FR | 2 314 857 | 1/1977 |
| WO | 97 29005 | 8/1997 |

* cited by examiner

*Primary Examiner* — Joseph D Pape
(74) *Attorney, Agent, or Firm* — Oblon, Spivak, McClelland, Maier & Neustadt, L.L.P.

(57) ABSTRACT

An underframe for an automobile including two side rails, a transverse crossbar, a first floor member attached on the side rails and, on either side, a lateral reinforcing member, and a second floor member. Each of the rails includes an extension in a form of a portion under the crossbar, attached to the lower face of the central crossbar and connected to an attachment portion including a front portion that extends gradually towards the respective lateral reinforcement member and that is attached on a longitudinal portion of the respective lateral reinforcement member.

8 Claims, 2 Drawing Sheets

UNDERFRAME FOR MOTOR VEHICLE

BACKGROUND OF THE INVENTION

I. Field of invention

The present invention relates to a motor vehicle underframe.

The underframe of a motor vehicle is the lower supporting part of the bodywork of the vehicle, on which the floor rests.

II. Description of the Related Art

The underframe of a motor vehicle comprises, in the conventional way, a floor fixed to two longitudinal side members running approximately in the longitudinal direction of the vehicle at a distance from each other. These side members are fixed to a central crossmember that runs transversely relative to the vehicle. Lateral reinforcing elements, or fender reinforcements, are attached to the ends of the central crossmember on each side of the vehicle. These lateral reinforcing elements run longitudinally along the vehicle and in planes perpendicular to the floor.

BRIEF SUMMARY OF THE INVENTION

It is an object of the present invention to provide a novel underframe structure for a motor vehicle.

This object is achieved with a motor vehicle underframe comprising, in a known manner, two side members that are oriented approximately in the longitudinal direction of the vehicle, are spaced apart from each other, and each have a first end, a central crossmember that is fixed to each of said first ends of said side members, in the transverse direction of said vehicle, and that has a lower face turned toward the underside of the vehicle, and an upper face facing the opposite way to said lower face, a first floor element fixed to said side members and to said lower face of said central crossmember, and, on each side, a lateral reinforcing element that is fixed to the end of said central crossmember and that extends longitudinally and in a plane approximately perpendicular to said first floor element. According to the invention underframe also comprises a second floor element fixed to said upper face of said central crossmember, said first end of each of said side members is continued by a sub-crossmember portion fixed to said lower face of said central crossmember, said sub-crossmember portion is attached to a fixing portion comprising a forward portion welded to that lateral face of said central crossmember which is toward said second floor element and an upper portion fixed to the underside of said second floor element, said fixing portion converges gradually on its respective lateral reinforcing element, and said fixing portion is fixed to a longitudinal portion of said respective reinforcing lateral element, such that forces acting on each side member are transmitted to said lateral reinforcing elements.

In one particular embodiment, the fixing portion comprises a web lying approximately in a plane perpendicular to said second floor element and converging gradually on its respective lateral reinforcing element.

The underframe of the invention may also comprise upper reinforcing elements for said side members which are welded to the upper face of said first floor element, in such a way that said first floor element is sandwiched between said side members and said upper reinforcing elements.

According to the invention, the sub-crossmember portion and the fixing portion can be part of the same component as the side member 3. In one particular embodiment, said sub-crossmember portion and said fixing portion form a separate component from said side member that is welded to the first end of said side member, thus simplifying the manufacture of the side member and the assembling of the underframe of the invention.

BRIEF DESCRIPTION OF THE DRAWINGS

The present invention, its features, and the various advantages which it provides will be understood more clearly on reading the following description of an embodiment, presented by way of non-restrictive example, with reference to the appended drawings, in which.

DETAILED DESCRIPTION OF THE INVENTION

Figure 1:
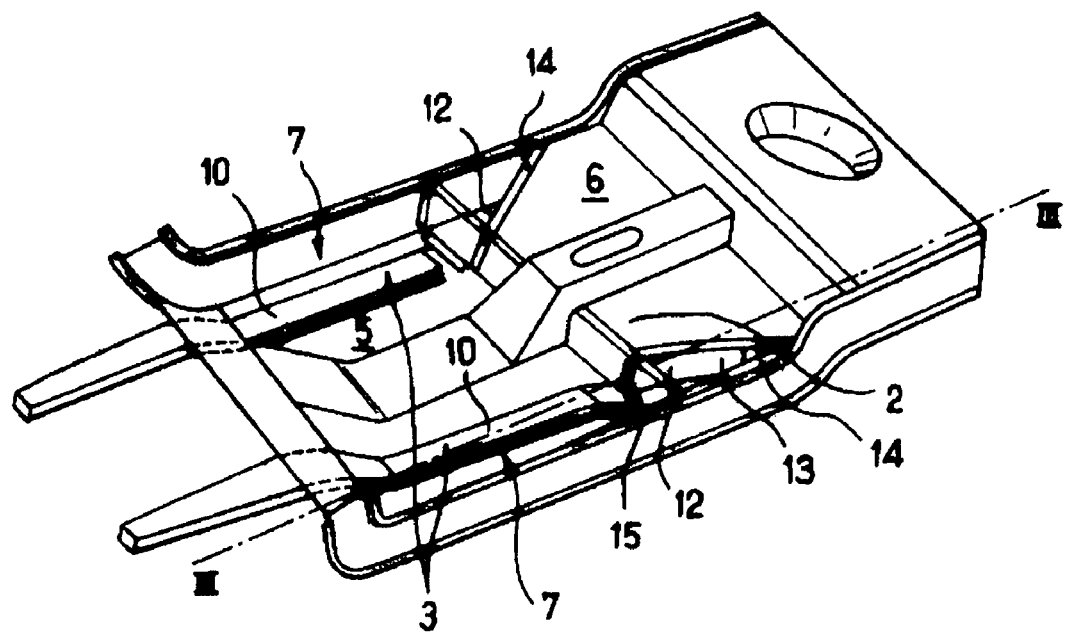
FIG. 1 is a general perspective view of the underframe of the invention.

Referring to FIG. 1, the underframe of the invention comprises a central crossmember 2 that extends transversely relative to the vehicle, and two side members 3 approximately perpendicular to the central crossmember 2. These side members 3 extend longitudinally and diverge from each other and away from the centerline of the vehicle toward the rear of the vehicle. The two side members 3 are welded to the underside of a first floor element 5 which lies on a portion of these side members 3 and is welded to the lower face 22 of the central crossmember 2, that is that face of the latter which is turned toward the underside of the vehicle. A second floor element 6, parallel to the first floor element 5, is welded to the upper face 21 of the central crossmember 2, that is that face of the central crossmember 2 which is turned toward the passenger compartment of the vehicle. On each side of the underframe is a lateral reinforcing element 7 welded to one end of the central crossmember and extending longitudinally relative to the side members 3 and in a plane approximately perpendicular to the two floor elements 5 and 6.

In the embodiment shown in FIG. 1, upper reinforcing elements 10 are welded to the first floor element 5, above the side members 3, so that the first floor element 5 is sandwiched between the upper reinforcing elements 10 and the side members 3.

Figure 2:
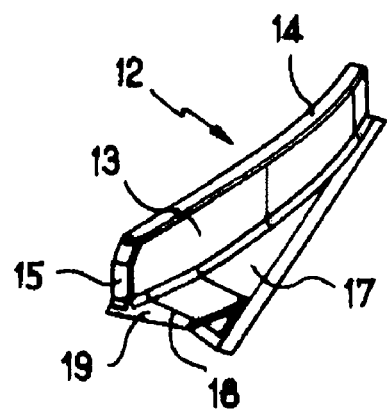
FIG. 2 is a partial view of one of the side members of the underframe shown in FIG. 1.

As depicted in FIGS. 1 and 2, a fixing portion 12 continues each of the side members 3 underneath the second floor element 6. This fixing portion 12 comprises a web 13 that forms a wall approximately perpendicular to the second floor element 6 and whose upper part comprises a flange 14 parallel to the second floor element 6 and welded to the lower face of the latter. This web 13 is approximately flat and is located underneath the second floor element 6. The web is angled toward the lateral reinforcing element 7 and meets the latter while remaining within a plane approximately perpendicular to the second floor element 6. As shown in FIG. 2, the end of the aforementioned web 13 is fixed to the lateral reinforcing element 7 at a surface occupying part of the height of the reinforcing element 7 and a longitudinal portion of the latter. This is to ensure a firm join and good transmission of forces through the side member to the lateral reinforcing element 7. The web 13 has a forward portion 15 that is welded to that lateral face of the central crossmember 2 which is turned toward the second floor element 6. This forward portion 15 fits between the upper and lower horizontal flanges on the longitudinal edges of the central crossmember 2 (the latter is I-shaped in transverse section). The web 13 is continued by an approximately triangular secondary fixing part 17 which is in the same plane as the web 13, toward the underside of the vehicle. This secondary fixing part 17 runs all the way along the length of the aforementioned web 13 and is welded to a portion of the lateral reinforcing element 7.

Figure 3:
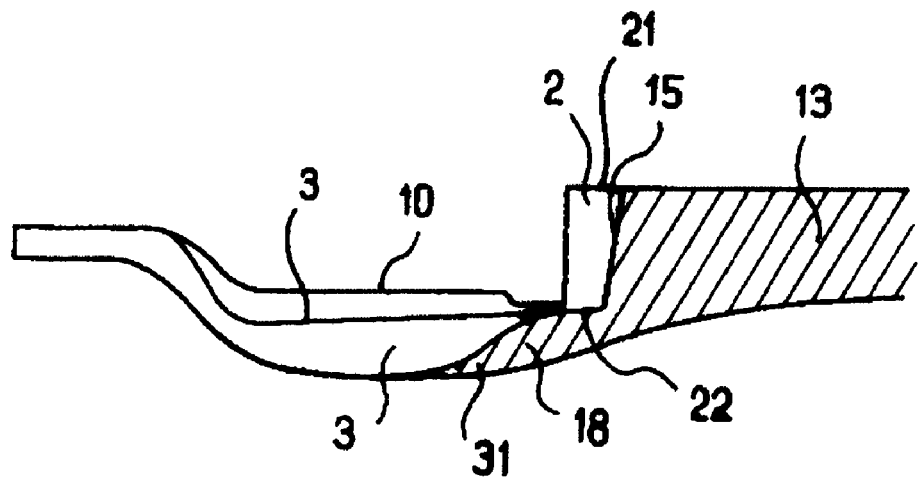
FIG. 3 is a longitudinal section on the axis III-III of the underframe shown in FIG. 1.

As shown in FIGS. 2 and 3, a sub-crossmember portion 18 is situated approximately at the forward face 15 of the web 13. This sub-crossmember portion 18 is approximately flat and is welded to the lower face 22 of the central crossmember 2. The forward edge 19 of this sub-crossmember portion 18 is welded to the lower face of the first end 31 of the side member 3, adjacent to the central crossmember 2. In transverse section the side member 3 is U-shaped, the bottom of the U corresponding to the lower face of the side member 3, that is that face which is turned toward the underside of the vehicle.

FIG. 3 shows in longitudinal section a portion of the underframe seen in FIG. 1. The sub-crossmember portion 18 is welded to the underside of the central crossmember 2. Its forward edge 19 extends toward the side member 3 obliquely and is welded to the first end 31 of the latter, at the lower face of the latter. The forward portion 15 is welded to the side wall of the central crossmember 2 and lies in a plane perpendicular to the second floor element 6.

Figure 4:
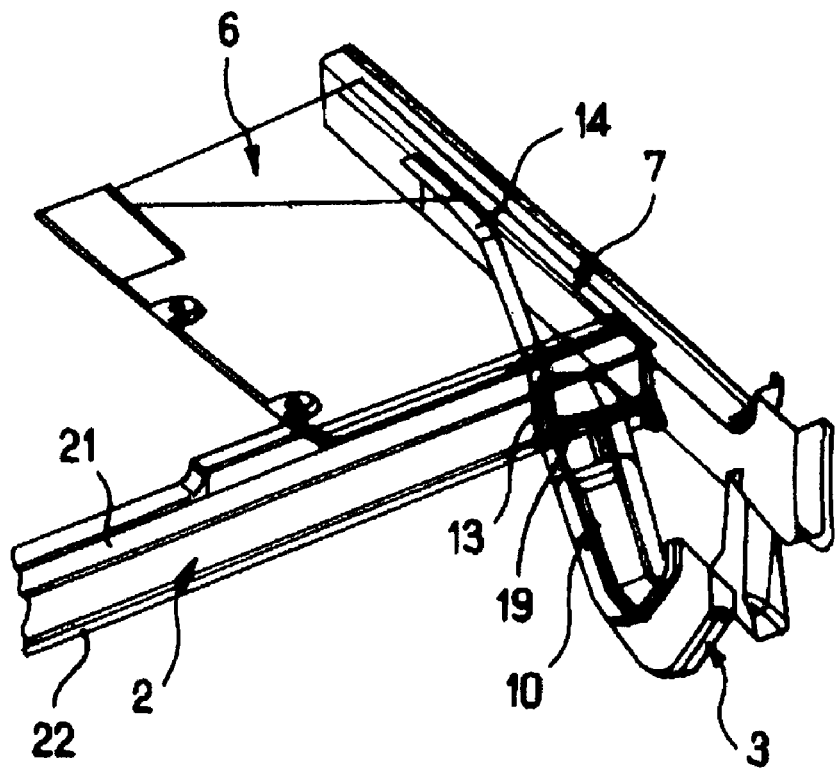
FIG. 4 shows the fixing portion and the sub-crossmember portion of the embodiment shown in FIGS. 1 and 2.

With reference to FIG. 4, the flange 14 of the web 13 is welded to the lower face of the second floor element 6 and a portion of this flange 14 runs alongside the lateral reinforcing element 7. The end of the web 13 that is parallel to the lateral reinforcing element 7 is welded to the latter. The side member 3 is welded to the sub-crossmember part 18 and extends toward the front of the central crossmember 2, underneath the first floor element 5, which is omitted in this figure.

The invention claimed is:

1. A motor vehicle underframe comprising:
    two side members that are oriented approximately in a longitudinal direction of the vehicle, are spaced apart from each other, and each having a first end;
    a central crossmember that is fixed to each of the first ends of the side members, in a transverse direction of the vehicle, and that includes a lower face turned toward the underside of the vehicle, and an upper face facing an opposite way to the lower face;
    a first floor element fixed to the side members and to the lower face of the central crossmember;
    on each side of the underframe, a lateral reinforcing element that is fixed to the end of an central crossmember and that extends longitudinally and in a plane approximately perpendicular to the first floor element; and
    a second floor element fixed to the upper face of the central crossmember,
    wherein the first end of each of the side members is continued by a sub-crossmember portion fixed to the lower face of the central crossmember,
    wherein the sub-crossmember portion is attached to a fixing portion comprising a forward portion welded to a lateral face of the central crossmember that is toward the second floor element and an upper portion fixed to the underside of the second floor element,
    wherein the fixing portion converges gradually on a respective lateral reinforcing element, and
    wherein the fixing portion is fixed to a longitudinal portion of respective lateral reinforcing element, such that forces acting on each of the members side are transmitted to respective lateral reinforcing elements.

2. The motor vehicle underframe as claimed in claim 1, wherein the fixing portion comprises a web lying approximately in a plane perpendicular to the second floor element and converging gradually on the respective lateral reinforcing element.

3. The motor vehicle underframe as claimed in claim 1, further comprising upper reinforcing elements for the side members upper reinforcing elements being welded to an upper face of the first floor element, such that the first floor element is sandwiched between the side members and the upper reinforcing elements.

4. The motor vehicle underframe as claimed in claim 2, further comprising upper reinforcing elements for the side members upper reinforcing elements being welded to an upper face of the first floor element, such that the first floor element is sandwiched between the side members and the upper reinforcing elements.

5. The underframe as claimed in claim 1, wherein the sub-crossmember portion and the fixing portion form a separate component from each of the side member that is welded to the first end of each of the side members.

6. The underframe as claimed in claim 2, wherein the sub-crossmember portion and the fixing portion form a separate component from each of the side member that is welded to the first end of each of the side members.

7. The underframe as claimed in claim 3, wherein the sub-crossmember portion and the fixing portion form a separate component from each of the side member that is welded to the first end of each of the side members.

8. The underframe as claimed in claim 4, wherein the sub-crossmember portion and the fixing portion form a separate component from each of the side member that is welded to the first end of each of the side members.

* * * * *